Nov. 10, 1936.　　　　B. D. HORTON　　　　2,060,419
METER TESTING
Original Filed Dec. 1, 1922　　5 Sheets-Sheet 1

Inventor:
Bryson D. Horton.
By Jones, Addington, Ames & Leibold
Attys.

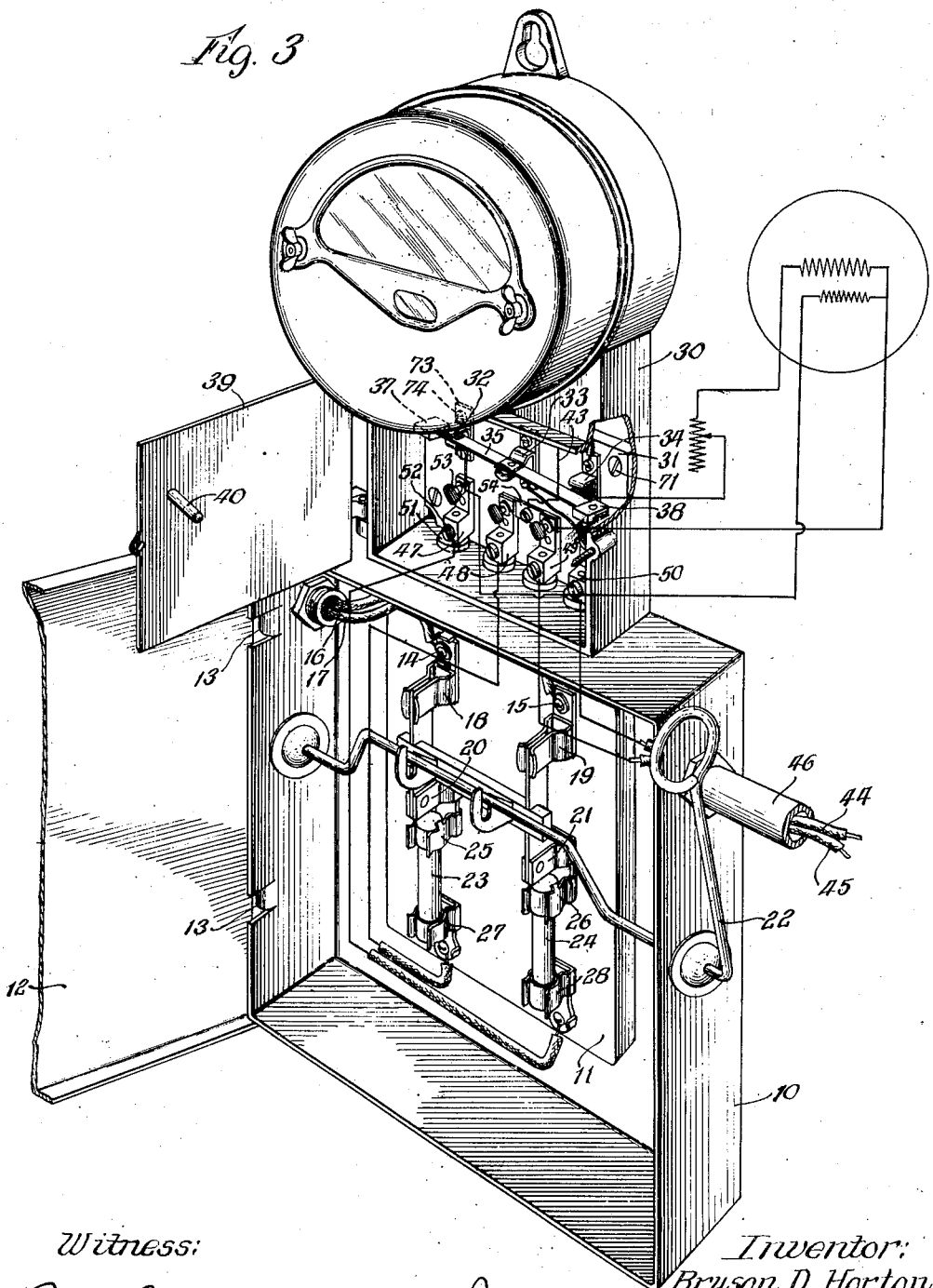

Nov. 10, 1936.  B. D. HORTON  2,060,419
METER TESTING
Original Filed Dec. 1, 1922   5 Sheets-Sheet 3
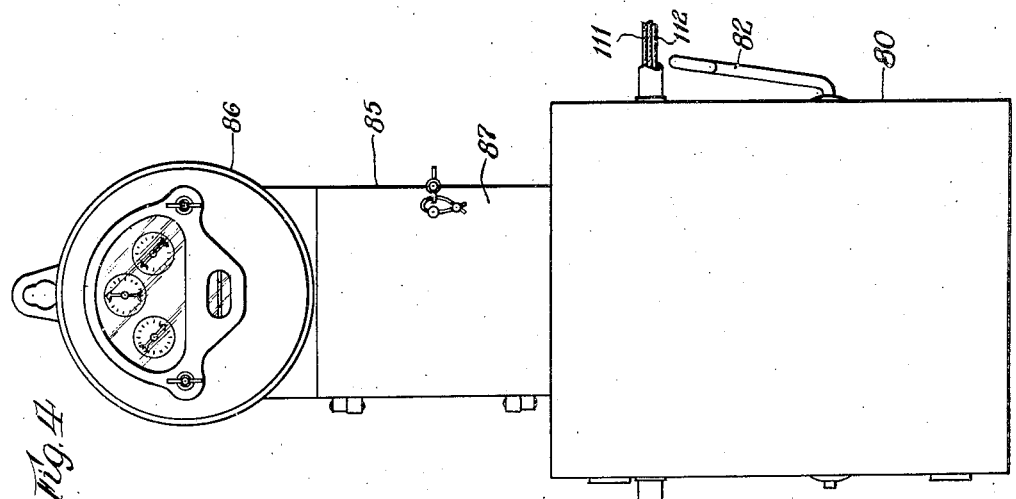
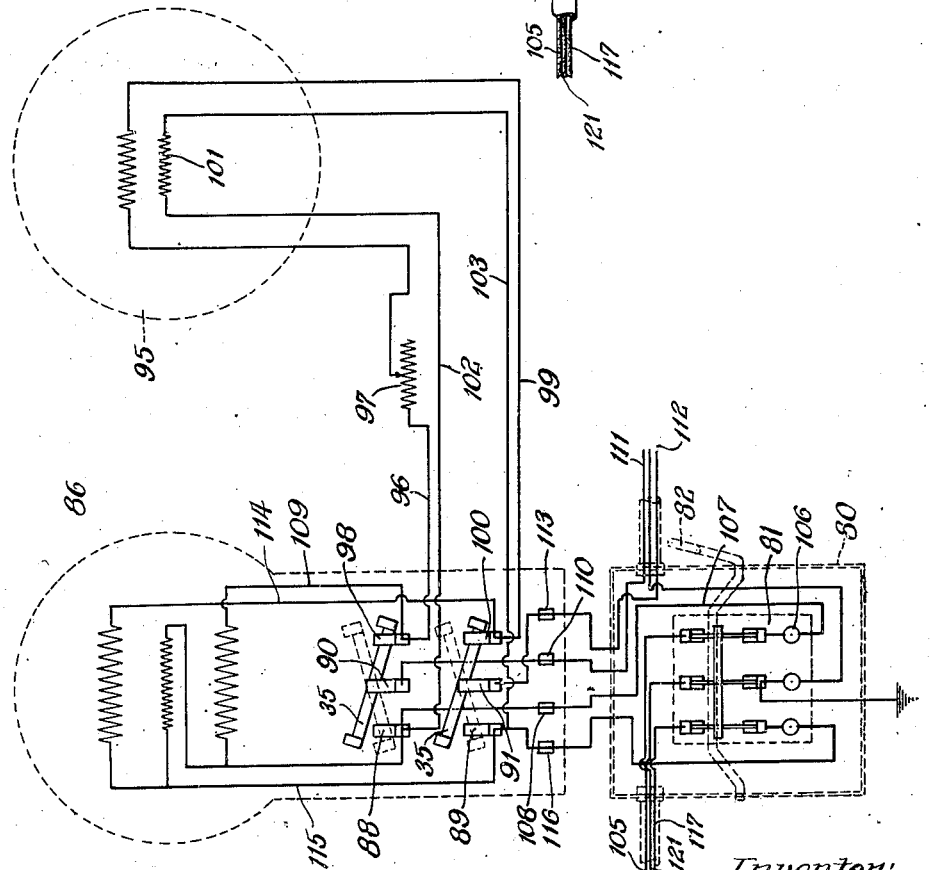
Witness:
Inventor:
Bryson D. Horton Nov. 10, 1936.  B. D. HORTON  2,060,419
METER TESTING
Original Filed Dec. 1, 1922   5 Sheets-Sheet 4

Witness:
Bertram M. Coltman

Inventor:
Bryson D. Horton
By Jones, Addington, Ames & Seibold
Attys.

Nov. 10, 1936.  B. D. HORTON  2,060,419
METER TESTING
Original Filed Dec. 1, 1922   5 Sheets-Sheet 5
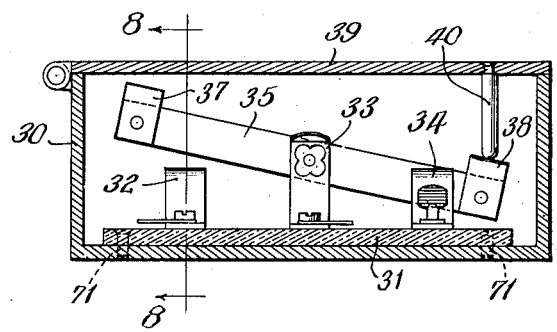
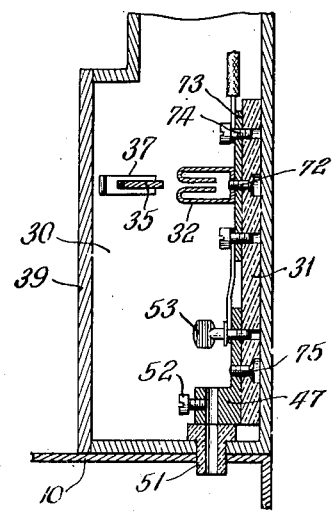

Patented Nov. 10, 1936

2,060,419

UNITED STATES PATENT OFFICE 2,060,419

METER TESTING

Bryson D. Horton, Detroit, Mich., assignor to Square D Company, Detroit, Mich., a corporation of Michigan Application December 1, 1922, Serial No. 604,383
Renewed January 8, 1931

15 Claims. (Cl. 175—183)

My invention relates to meter testing and more particularly to apparatus for conducting meter tests, embodying improved means for quickly switching the meter circuit from the normal service condition to the meter test condition and, after a test, returning the meter circuit to normal service condition.

My invention is an improvement over the apparatus described and claimed in the United States Patent, 1,338,180, granted to me on April 27, 1920. In this patent, a testing block is provided for connecting the load directly with the service circuit, and for cooperating with a meter load disconnecting switch to by-pass the meter. In one of the forms disclosed, the switch is connected in the circuit so that this block could be inserted in and removed from the circuit without regard for the position of the switch. In another form of the disclosure, insertion of certain of the test plugs is permissible only before the meter load disconnecting switch has been operated to by-pass the meter, so that upon removal of the testing plugs, the meter must be first restored in the circuit by the reverse operation of the switch. Thus an interrelation existed between the testing apparatus and the meter load disconnecting switch, to prevent leaving the meter out of circuit after the meter tests, in which case the current supplied to the customer would not be measured. The invention disclosed in this patent also included means for preventing the closing of the protective housing containing the meter test apparatus, without first "necessitating" or "requiring" the reverse operation of the meter load disconnecting switch in order to restore the meter circuit to normal service condition. It is thus apparent that the trend of development has been towards providing means for completely enclosing the meter test apparatus to prevent unauthorized tampering therewith and yet to prevent the meter tester from leaving the apparatus in such a condition as would allow the current to go unmeasured after a test.

It is an object of my invention to provide "positive" means for reversing the position of the switch after the meter test, upon closing the cover of the protective housing. I term this means positive in that merely closing the cover of this protective housing will operate to reverse the position of the switch, as distinguished from the prior art where the cover would only necessitate or require that the switch be closed before the cover could be closed.

According to the teachings of my invention I preferably employ a double throw switch and embody the same in what is called the meter terminal box, thereby requiring a minimum number of test connections to establish a testing circuit. I believe that I am the first to provide such an arrangement and therefore claim the same broadly.

A further object of my invention is to provide an improved form of test switch in connection with the apparatus shown herein for conducting the meter tests. While any form of switch may be employed in the meter terminal chamber in connection with the positive switch closing action of the cover thereof, I preferably use a switch which performs the dual function of by-passing the current and disconnecting the meter in one movement thereof.

The novel details in the construction and arrangement of parts of a structure embodying the invention will be apparent from the following specification when read in connection with the accompanying drawings forming a part thereof, and wherein convenient embodiments of the invention in two wire and three wire electrical systems are illustrated. It is to be understood, however, that the invention is not to be restricted to these specific embodiments, because as will be obvious, other embodiments may be resorted to without, in the least, departing from the spirit of the invention.

In the drawings:

Fig. 3 is a perspective view of the structure shown in Fig. 1, but with the doors of the service switch enclosure and meter terminal chamber open, the meter load disconnecting switch being illustrated in meter testing position;

Fig. 4 is a front elevation of a structure similar to that shown in Fig. 1;

Fig. 5 is a wiring diagram of a three wire circuit of the apparatus shown in Fig. 4;

Fig. 7 is a transverse section through the meter terminal box, illustrating the cover thereof closed with the meter test switch in normal service position; and Fig. 8 is a section taken on line 8—8 of Fig. 7, illustrating the mounting of the terminal contacts and switch contacts.

Figure 1:
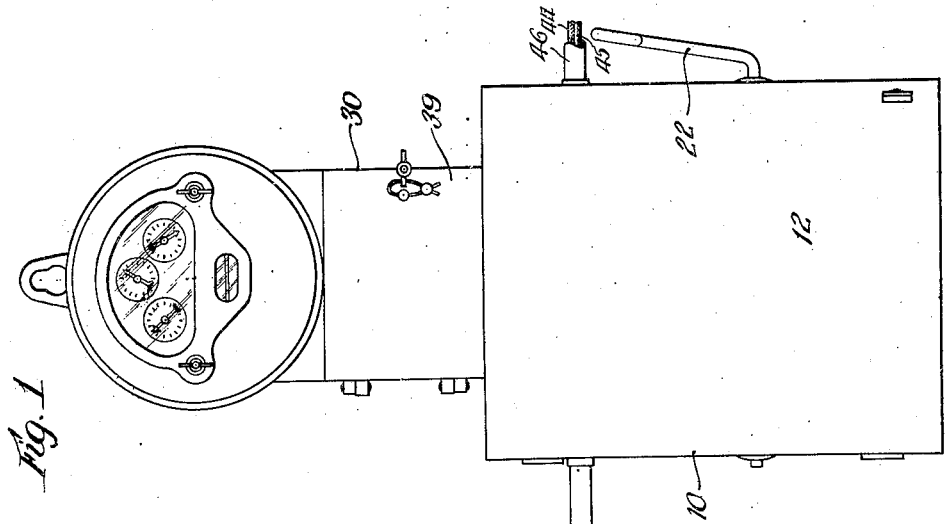
Figure 1 is a front elevation of the apparatus embodying my invention, having a meter terminal box inserted between the meter and switch box to serve as a protective enclosure for the testing apparatus and interconnecting wiring.
Figure 2:
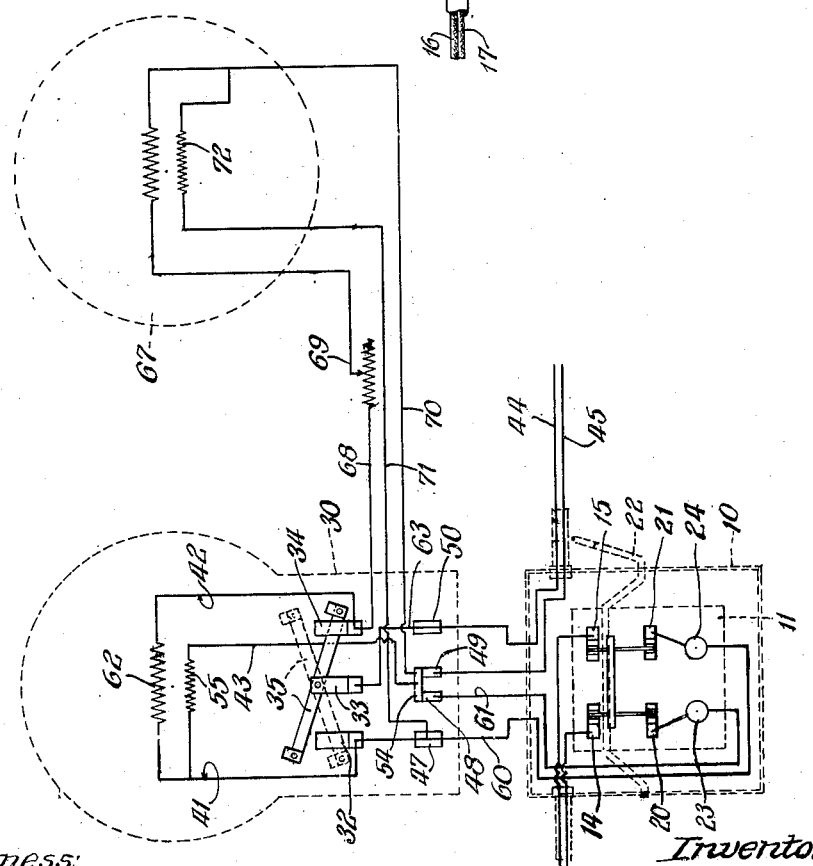
Fig. 2 is a wiring diagram of a two wire circuit of the apparatus, shown in Fig. 1, with the testing circuit inserted therein, the meter load disconnecting switch being illustrated in normal service condition.

Referring now in detail to the embodiment illustrated in Figs. 1, 2, and 3 inclusive, it will be noted that the switch housing or enclosure 10 carries an insulating base 11 and is fitted with the cover 12 hinged at 13. Mounted on the base 11 are the service line terminals 14 and 15, to which are attached the service conductors 16 and 17. The line terminals 14 and 15 carry the switch contact clips 18 and 19, and positioned midway on the insulating base 11 are the co-operating switch contact clips 20 and 21, respectively. The switch contact clips 18 and 19, respectively, and 20 and 21, respectively are bridged by the movable portion of the switching mechanism operated by the handle 22, which mechanism is suitably pivoted to the switch contact clips 20 and 21, and consists of conventional switch blades and protecting fuses 23 and 24, preferably of the cartridge type. In this particular instance, the fuses 23 and 24 at their upper end are inserted in suitable contact clips 25 and 26, secured to the switch contact clips 20 and 21, and at their lower end in the contact clips 27 and 28 secured to the insulating base 11. The switch handle 22 extends through one side of the switch box in a well known manner, so that the switch may be operated from the exterior of the switch box. This switch handle is suitably carried, in journaled relation, in the sides of the switch enclosure 10, and is of the well known bail type broadly claimed by applicant in United States Patent 1,378,232, issued to him on Oct. 28, 1918.

Mounted directly above the switch enclosure 10 is an enclosure 30 carrying the testing apparatus and the connections for completing the meter load circuit, which enclosure I have termed the meter terminal box or the meter terminal chamber. The testing apparatus consists of an insulating base 31 mounted on the back wall of the enclosure 30, said insulating base 31 being equipped with terminal clip contacts 32, 33, and 34 of the meter test switch 35. The switch 35 is pivotally carried by the central contact 33, and is adapted alternately to engage with the contacts 32 and 34. I preferably provide this switch 35 in the form of a knife blade, and mount at each end blocks 37 and 38 which are so arranged that one will always extend a distance equal to the throw of the switch away from the base 31, in the direction of a cover 39 hingedly connected to the enclosure 30. The cover 39 is provided with a pin or other suitable projection 40, so arranged as to engage the switch block 38 when the door 39 is closed. Thus it will be seen that cover 39 is so constructed that the closing thereof will positively force the switch 35 into engagement with the clip contact 34 and out of engagement with the clip contact 32.

Connected to the enclosure 30 is a well known type of meter. This meter is electrically connected with the testing switch 35 by means of the wires 41, 42, and 43, (Fig. 2) these wires being carried through the meter at a point where the latter connects with the enclosure 30. Consequently, the wires leading from the meter are completely enclosed and tampering therewith is prevented.

The particular arrangement, disclosed herein, of the service meter, enclosure 30 and switch box 10 is to be noted as an important feature of the invention. It allows the meter manufacturer to provide the meter and the enclosure for carrying the testing apparatus as units and market them as such. The great variety of different size meters renders it impractical, in most instances, to do otherwise. I however, do not intend to limit myself to such an arrangement, but merely desire to point out the advisability of having the two manufactured as one. It is apparent that the meter and the enclosure 30 may be made integral, or they may be separate and attached together at the factory, or at the place of installation. In either case, it is an advance over the art to have an enclosure, which receives the testing clips and means for changing the circuits from one condition to another, mounted directly between the meter and the switch box, so that, in installing, this enclosure may be set upon the switch box with the meter carried thereon, and the wires entirely concealed by passing through openings, in each, continuous with one another.

In the embodiment of the invention illustrated in Figs. 1 to 3 inclusive, the service switch and meter test enclosing housing are shown as individual and separate parts, but obviously these parts could readily be combined into one enclosure capable of receiving all the apparatus associated with the service circuit, as well as the switching circuit, and I therefore do not intend to limit myself to the disclosure herein shown. I, however, find certain advantages in embodying the meter test switch and testing apparatus in the meter terminal box and in disposing this meter terminal box between the meter and service switch enclosure so as to form a continuous protective enclosure for the testing apparatus and connections.

The customer's load is connected to the conductors 44 and 45, carried into the enclosure 10 through a suitable opening in the wall of the enclosure, with which is preferably inter-connected a conduit, such as 46.

As part of the meter testing apparatus, a plurality of terminal contacts 47, 48, 49 and 50 are provided on the base of the meter terminal box. As shown in Fig. 8, suitable openings are provided in the base wall of the meter terminal box 30 to receive the conductor nipples 51, which nipples align with the respective terminal contacts, so that this box 30 will be suitably insulated from the conductors leading from the switch enclosure 10. These conductors pass through the nipples 51 and connect to the terminal contacts as by means of the screws 52. The terminal contacts are provided with integral extensions receiving the thumb screws 53, which receive meter and meter test connections. A bar 54 is bridged across the terminal contacts 48 and 49 and receives the conductor 43 connecting with a potential coil 55 of the load meter. In order that it may be inserted in the line circuit in the usual manner, the potential coil 55 has its opposite end connected to the interconnecting conductor 41.

In Figs. 7 and 8, I have shown, in detail, the mounting of the test switch 35 and terminal contact 47. The insulating base 31 is secured at its corners to the enclosure 30 by screws 71. Extending from the under side of base 31 are screws 72 for securing the terminal clip contacts 32, 33 and 34. Conductor bars 73 are interposed between these terminal clip contacts and the base 31 for receiving screws 74, to which are connected conductors of the different circuits. The terminal contacts are similarly mounted on the base. Screws 75 lead upwardly from the under side of base 31 into the terminal contacts, so that the latter are tightly held adjacent the nipples 51, as hereinbefore described. Both thumb screws and the ordinary grooved screw are provided in connection with these terminal contacts for suitably receiving the proper conductors. From this description it will be noted that I have provided a simple and endurable meter test switch unit, conveniently located in a meter terminal chamber between the service switch box and meter, and in addition provided adjacent this test switch suitable contacts for receiving the wiring leading from the circuits.

Referring now to Fig. 2 wherein there is shown a wiring diagram of the structure embodying my invention as shown in Fig. 3, it will be seen that the meter is in normal service condition although the meter testing circuit is shown connected between the meter circuit and load circuit. With the testing switch 35 in the position shown in this figure, the current will be fed to the customer through the service switch over a circuit which may be traced as follows: From the service lead 16 to service line terminal 15, through the adjacent side of the service switch, the fuse 24, by way of the conductor 60 to the contacts 47 and 32, thence through the conductor 41 to the series coil 62 of the meter, the conductor 42 to the terminal clip contact 34, across the testing switch 35 to the terminal clip contact 33 and by way of the conductor 63 and terminal contact 50 to the wire 44 of the load line. Returning from the load line by the wire 45, the current will flow past the terminal contacts 49 and 48, which are bridged by the bar 54, and thence to the service switch by the conductor 61, and finally out through the line wire 17.

The testing circuit may be of any suitable type. However, I have illustrated the type known as the artificial load comprising a test or calibrating meter 67 having a resistance load 69 connected therewith. In this testing circuit are included the conductors 68 and 70, suitably connecting to the terminal clip contact 34 and terminal contact 49, respectively; and the conductor 71 suitably connecting to the terminal contact 47.

In order to test the load meter, the door 39 of the meter terminal box 30 is opened and the testing switch operated to engage the terminal 32 and thereby disengage the terminal 34. It will be noted that this switch is of the make before break type so that the current is by-passed around meter before the meter is disconnected. Consequently, there is no interruption in the flow of the current to the customer's line. The conductors 68, 70 and 71, are, however, first inserted in the meter terminal box, so that the series coils of the load meter and test meter are in series with each other, and the potential coil of the latter properly connected across the line circuit.

The conversion of the circuit to the test condition in which the current to the customer is by-passed and the meter disconnected from the load circuit is performed without in any way operating the service switch and its appurtenant apparatus, and consequently the testing connections as well as the load circuit, are protected by the main service switch and fuses 23 and 24.

With the apparatus in this condition, viz., testing condition, the flow of current may be traced on the wiring illustrated in Fig. 2. From the service conductor 16 through the service switch to the interconnecting conductor 60, to the contact 47, thence through the testing switch 35, shown in dotted lines, to the conductor 63, contact 50, and conductor 44 of the load circuit, through the load, back over the conductor 45, terminal contacts 49 and 48, and thence through the interconnecting conductor 61 and the other side of the service switch to the other service lead 17.

In this circuit it will be noted that the meter load circuit which was connected from the terminal clip contact 32, by means of the conductor 41 having the series coil of this meter between it and the conductor 42 connecting with the other end terminal clip contact 34, has been by-passed and disconnected from the load circuit by the test switch 35 reversing its position to engage the contact 32.

The service meter can now be readily tested without interfering with the supply of current to the consumer, and this test circuit may be traced as follows: From the service conductor 16, through the service switch, its fuses, the interconnecting conductor 60, terminal contact 47, terminal clip contact 32, conductor 41, series coil 62, conductor 42, the terminal clip contact 34 at the other end, wire 68, test load 69, through the series coil of the calibrating meter 67, wire 70, to the terminal contacts 49 and 48, interconnecting conductor 61, through the other side of the service switch and finally service wire 17.

With these conditions established the load meter can be properly calibrated without interference with the supply of power to the consumer. The pin 40 on the cover 39 of the meter terminal chamber 30 is so positioned as to engage the block 38, if an attempt is made to close the cover 39, before the test switch 35 has been reversed in position in order to restore the meter circuit to normal service condition. It is apparent, however, that should it be so desired, the closing of the cover 39 may be relied upon to reverse the position of switch 35, after the testing circuit connections have been removed. Thus, it is impossible to leave the meter out of service after the test, because the closing of the cover 39 will not necessitate but positively force the switch to reverse its position, and thereby restore the load meter to the load circuit.

An important advantage in the type of test switch which I have provided, lies in the fact that it not only by-passes the current around the meter in moving from normal service condition to meter testing condition, but also in the same movement the switch disconnects the meter coil from the load circuit. These functions are performed in over-lapping relation, due to the make-before-break character of the switch, and as before pointed out, this prevents interruption to the customer's service.

For a three wire circuit the apparatus is substantially the same as in a two wire circuit, the service switch mechanism being embodied in a similar enclosure 80 and the meter and testing apparatus connections in a similar enclosure 85. As illustrated, the service switch 81 is externally operated by means of the external handle 82 and the enclosure 85 is mounted directly above the switch enclosure 80, with the service meter 86 carried at the upper end thereof, for completely enclosing the apparatus and conductors in a continuous protective enclosure to prevent tampering therewith. In the case of a three wire circuit the test switch 35 is duplicated on both the positive and negative sides of the service circuit.

Figure 6:
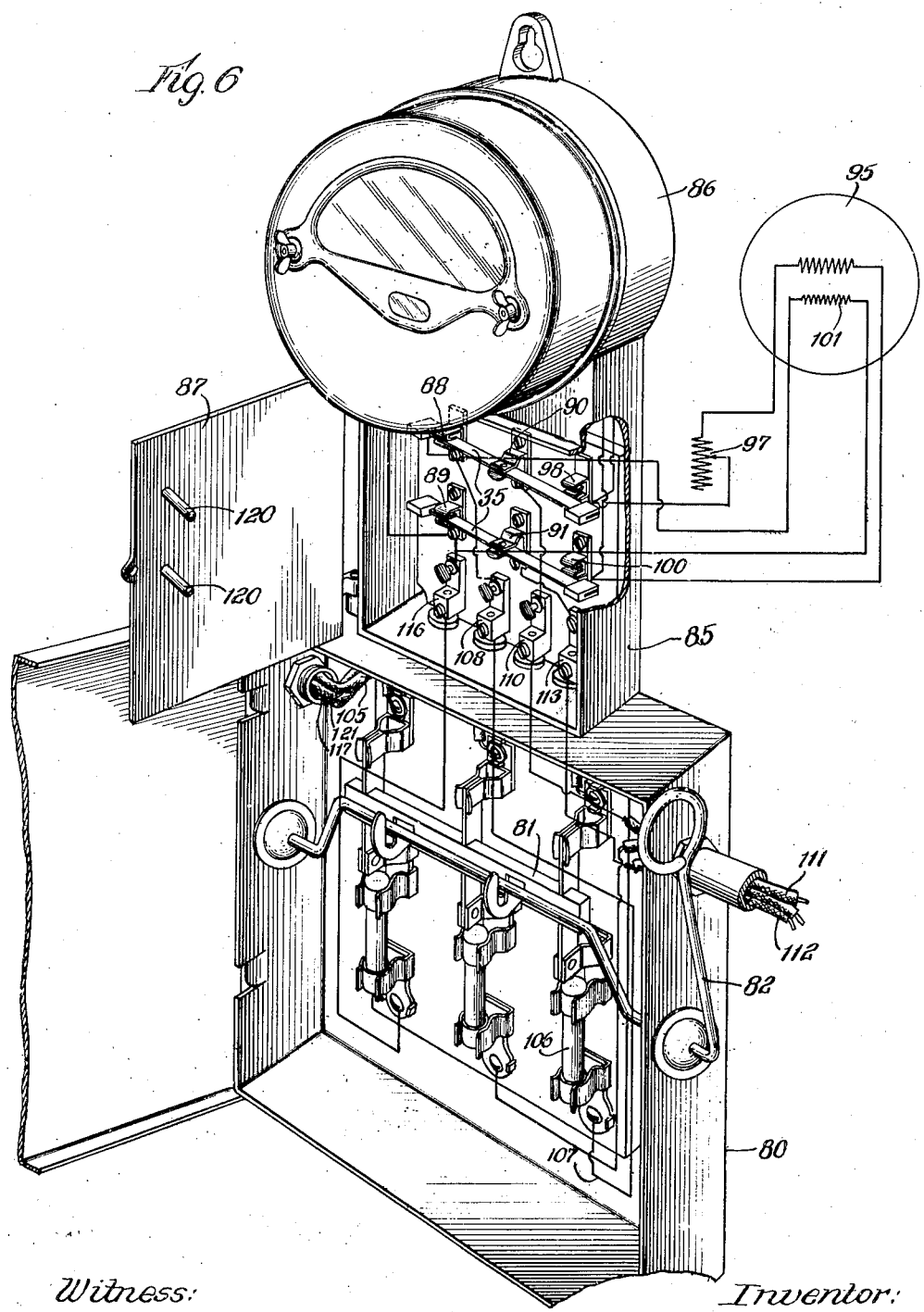
Fig. 6 is a perspective view of the same apparatus.

With the apparatus shown in Fig. 4, when a test is to be made, the cover 87 is opened and the testing switches 35 operated to engage the terminal clip contacts 88 and 89, disposed in the positive and negative sides of the circuit, as shown in Fig. 6. The switches 35 being pivoted on the contacts 90 and 91, which are also similarly disposed, form a by-pass for the current to flow around the meter, so that during the test the customer's line will be directly connected with the service circuit. The connections of the testing apparatus are then inserted in the meter terminal chamber 85. The series coil of the calibrating meter 95 is connected in series with the series coils of the service meter 86 by means of a conductor 96, having a test load 97 therein connecting to a clip contact 98, and by a conductor 99 connecting to a clip contact 100, both of these clip contacts being engaged by the testing switches during normal service condition, as shown in full lines in Fig. 5. The potential coil 101 of calibrating meter 95 is connected across the service line by means of conductors 102 and 103 connecting with the clip contacts 88 and 89.

Inasmuch as the arrangement of the apparatus in a three wire circuit is similar to that used in a two wire circuit, a brief description thereof will be given in connection with outlining the circuits, during normal service and testing conditions. In Fig. 6 the wiring has been shown superimposed upon the structure merely for the sake of convenience in tracing the circuits in connection therewith.

However, in tracing the circuits reference is made to the wiring diagrams shown in Fig. 5 wherein the normal service condition is indicated by the full line position of the test switches, and the testing condition indicated by the dotted line position of the switches, the relation of the test circuit being of course illustrated in both instances.

The service circuit runs from the service lead 105 through the service switch 81, the line fuse 106, the interconnecting conductor 107 to one of the terminal contacts 108 in the bottom of the meter terminal chamber 85, to the clip contact 88 and thence through one of the series coils of the meter 86, the conductor 109, clip contact 98, through the upper test switch 35, central clip contact 90, terminal contact 110 and wire 111 of the load circuit, through the load, and back over the conductor 112, terminal contact 113, central clip contact 91, the other test switch 35, conductor 114, the second series coil of meter 86, interconnecting conductor 115, clip contact 89, the terminal contact 116, and through the other side of the service switch to the service wire 117. The neutral wire 121 passes from the line to the upper terminal of the service switch 81, through the switch, and on to the load circuit.

In making a test with a three wire circuit of the type illustrated herein, the series coils of meter 86, together with the calibrating meter and test load, are connected across the positive and negative wires of the service line. The conductors 96 and 99, carrying the calibrating meter and test load, connect to the disengaged clip contacts 98 and 100 of the test switches 35, when the latter are in testing position, so that the calibrating meter and test load will be in series relation with the coils of the load meter 86.

The circuit in testing condition may now be traced, preferably in Fig. 5, as follows: From the service line 105, through one side of the service switch 81, terminal contact 108, to the upper test switch 35, across the switch (dotted line position), to the terminal contact 110, and conductor 111 of the load circuit, through the load, back over the conductor 112 to the terminal contact 113, through the lower test switch (dotted line position), to the terminal contact 116, through the other side of the service switch and back to the service wire 117. The neutral wire 121, in this connection, remains the same.

The testing circuit of the three wire system may be traced by the service wire 105, service switch 81, through the conductor 107, terminal contact 108, clip contact 88 of the upper test switch 35, through one of the series coils of the load meter, conductor 109, to the clip contact 98, conductor 96, test load 97, series coil of the calibrating meter, through the conductor 99, clip contact 100, conductor 114, the other coil of the load meter, through the conductor 115, clip contact 89 of the lower test switch, and thence through the service switch and back to the line through the service lead 117.

It will be noted in Fig. 6, that the cover 87 of the meter terminal enclosure 85 is provided with a pair of pins 120 which project inwardly so that they will engage the right hand end of the test switches when the cover is closed. If the test switches happen to be in testing position, this end of each test switch will, of course, be disengaged from the clip contacts 98 and 100, and consequently this end will protrude in the direction of the cover 87. The cover in moving to closed position will bring the pins 120 upon the protruding ends, with the result that the switches will be forced into engagement with the clip contacts 98 and 100. The pins 120 are of sufficient length to move the switches completely through their movement, so that the current will not remain by-passed with the service meter connected, but the by-pass broken after the service meter is replaced in circuit with the customer's load.

From the foregoing description, it will be seen that I have provided an improved meter testing apparatus capable of permitting the service meter to be readily tested with the testing connections inserted in the meter terminal chamber. The test switches are uniquely mounted in this chamber and function to by-pass the current and disconnect the service meter in one movement which increases the simplicity and readiness with which the test may be made. It is to be particularly noted that the closing of the door functions to reverse the position of the test switches after a test has been made, so that it is impossible to apply the customary seal to the meter terminal chamber door without the meter first being reinserted in the load circuit. Consequently, current can never go unmeasured after a test.

I do not intend to limit myself to the particular details shown and described as it is apparent that various modifications may be made. For instance, reversing the position of the test switch by the closing movement of the door may be embodied in various devices where it is necessary either to close or to reverse the position of the switch before the door of the device is closed.

I claim:

1. In combination, a service circuit, a load circuit, a meter for measuring the current delivered to said load circuit, a terminal box provided with a cover thereon, a double throw double pole switch for by-passing the current around said meter, said switch disposed within said terminal box so that the switch is moved out of by-passing position when said cover is closed.

2. In an electrical system, a meter circuit having two series coils, a service circuit and a load circuit electrically connected to said coils, a switch in each of the coil connections for determining the relation of the coil with respect to said service and load circuits, a meter testing circuit adapted to be associated with said meter coils when the switches are in one position, said switches being disposed in a chamber adjacent the meter, and cover means for moving said switches in another position to render said meter testing circuit ineffective.

3. In an electrical system, a service circuit and a load circuit, a meter circuit having two coils in electrical connection with said service and load circuits, said coils being connected in series with each other but with the load therebetween so that the current flows through the load before passing through the second coil, switch mechanism in said circuits for disconnecting said meter coils from said load circuit, a terminal chamber for carrying said switch mechanism, and a cover on said chamber for engaging and reversing the position of said switch mechanism whereby the meter coils can not remain disconnected from said load circuit when said chamber is closed.

4. In combination, a service circuit, a load circuit, a meter for measuring the energy delivered to said load circuit by said service circuit, a terminal box having a cover and a multi-pole, multi-throw switch for by-passing the current around said meter, said switch being so disposed within said terminal box that it is moved out of by-passing position when said cover is closed.

5. In combination, a service circuit, a load circuit, a meter for measuring the energy delivered to said load circuit by said service circuit, a terminal box having a cover and a multi-pole, multi-throw switch for by-passing the current around said meter, said switch being so disposed within said terminal box that it is moved out of by-passing position and into normal service-establishing position when said cover is closed.

6. In a meter test system, a terminal chamber adapted for association with a meter, a plurality of meter connection terminals and meter-testing contacts and a plurality of circuit-changing elements housed in said terminal chamber, and a cover for said chamber operable on its closing movement to effect a plurality of circuit changes through said circuit-changing elements to establish normal service connections through said meter connection terminals.

7. In a meter test system, a terminal chamber adapted for association with a meter, a plurality of meter connection terminals and meter-testing contacts and a plurality of circuit-changing elements housed in said terminal chamber, a cover for said chamber and an operating member carried by said cover and adapted to engage said circuit-changing elements and to operate the same to insure the establishment of normal service connections through said meter connection terminals when said cover is closed.

8. The combination with a housing and a cover therefor, of a meter test equipment enclosed within said housing and comprising a multi-pole, multi-throw switch operable by closing movement of said cover to restore said switch to its original position after actuation thereof to a different position while said cover is open.

9. A meter test equipment comprising terminals severally adapted for connection to service and load circuits and to a meter to be normally connected between said circuits, a terminal box enclosing said terminals and provided with a cover, and double throw double pole switching means for by-passing current around such meter, said switching means being so disposed within said terminal box that said switching means are moved out of by-passing position when said cover is closed.

10. In a meter testing and service switch device having a switch, a handle therefor, and a cover for the switch box, said cover and said handle being so constructed that closing of said cover automatically causes said handle to move out of meter testing position, if it be there, and into service position.

11. A switching device adapted to be connected in an electrical system which latter system comprises a meter circuit having two series coils, a service circuit, a load circuit and a meter testing circuit adapted to be associated with said meter coils, which device comprises a switch to be connected in each of the coil connections for determining the relation of the coil with respect to said service and load circuits, said switches being disposed in a chamber adjacent the meter, and cover means for moving said switches,—when they are in one position to associate the meter testing circuit with the meter coils,—to another position to render said meter testing circuit ineffective.

12. A switching device adapted to be connected with an electrical system which latter system comprises a service circuit, a load circuit, a meter circuit having two coils in electrical connection with said service and load circuits, said coils being connected in series with each other but with the load therebetween so that the current flows through the load before passing through the second coil, said switching device comprising switch mechanism in said circuits for disconnecting said meter coils from said load circuit, a terminal chamber for carrying said switch mechanism, and a cover on said chamber for engaging and reversing the position of said switch mechanism whereby the meter coils which may be connected to said switch mechanism cannot remain disconnected from said load circuit when said chamber is closed.

13. A switching device associable with a meter and a meter testing circuit comprising a circuit establishing means providing connection either to said meter alone for normal service operation or to both said meter and said meter testing circuit to calibrate said meter, said device being provided with a cover movable to encase said circuit establishing means,—when the latter is in service position, and a member on said cover adapted to project into contact with said means when it is attempted to close said cover and said means is in meter testing position.

14. A switching device associable with a meter and a meter testing circuit comprising means for connecting the meter to a normal load circuit and means for establishing a meter testing circuit, said device being provided with a cover movable to encase said means and said cover being positively engageable with the means establishing the meter test circuit to move the latter means out of such position,—should they be in such position,—as the cover is closed.

15. A service and meter testing switch comprising an insulating base, stationary and movable contacts mounted thereon, operating means for the movable contacts to vary their connections with the stationary contacts, meter testing terminals, means to change the movable contacts from metering to meter testing position, and a locking device normally preventing the change of the movable contacts from metering position to meter testing position.

BRYSON D. HORTON.